W. W. ANNABLE & J. W. FITZGERALD.
CLUTCH.
APPLICATION FILED JAN. 13, 1910.
1,050,757.
Patented Jan. 14, 1913.
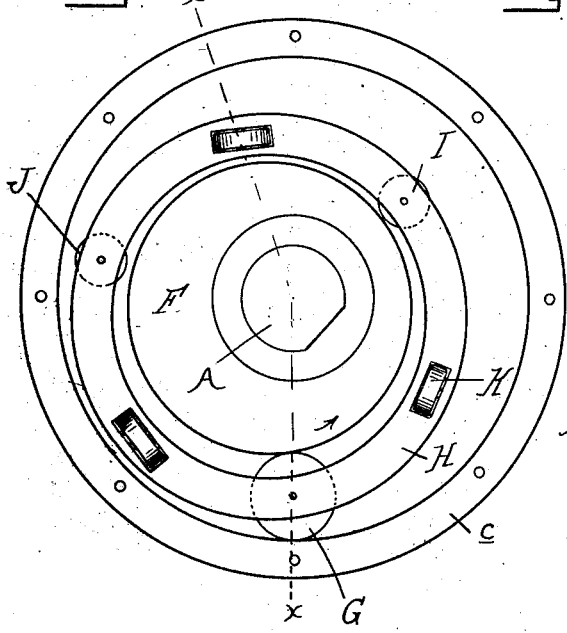
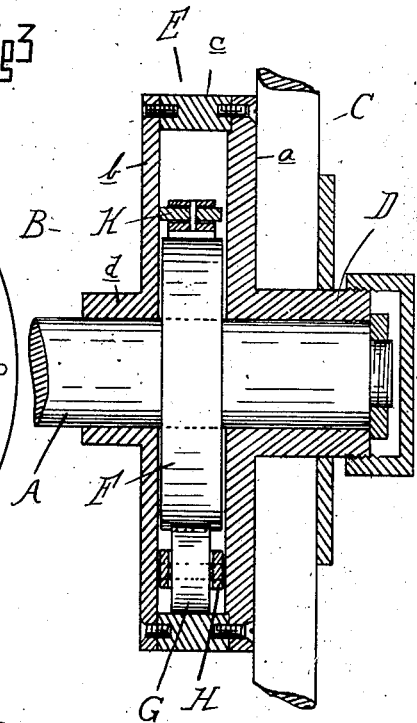
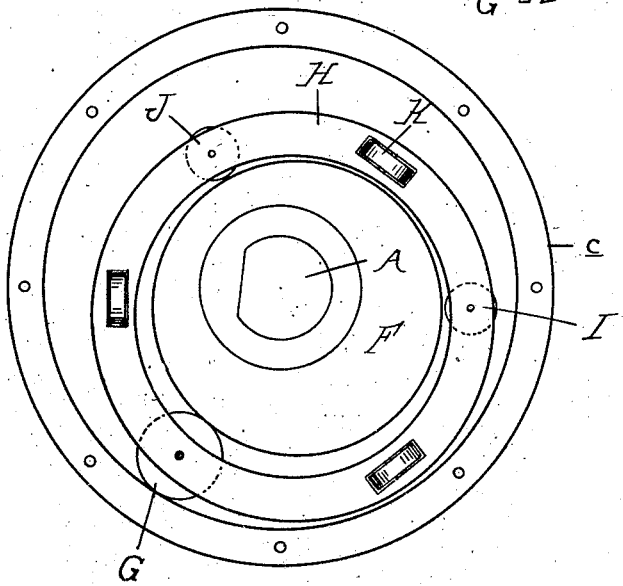
Witnesses
Inventors
Warren W. Annable & John W. Fitzgerald
By Whittemore, Hulbert + Whittemore
Attys

UNITED STATES PATENT OFFICE.

WARREN W. ANNABLE AND JOHN W. FITZGERALD, OF GRAND RAPIDS, MICHIGAN.

CLUTCH.

1,050,757.  Specification of Letters Patent.  Patented Jan. 14, 1913.

Application filed January 13, 1910. Serial No. 537,906.

*To all whom it may concern:*

Be it known that we, WARREN W. ANNABLE and JOHN W. FITZGERALD, both citizens of the United States of America, residing at Grand Rapids, in the county of Kent and State of Michigan, have invented certain new and useful Improvements in Clutches, of which the following is a specification, reference being had therein to the accompanying drawings.

The invention has particular reference to a clutch mechanism especially designed for use in connection with automobiles as forming an operative connection between the driving shaft or axle and the wheel, and it consists in the novel and simple construction of the clutch, in the peculiar arrangement and combination of parts, and in various details of construction, as will be more fully hereinafter described and claimed.

In the drawings,—Figure 1 is a view in elevation of the clutch mechanism, with a portion of the housing removed to illustrate the interior parts; Fig. 2 is a similar view, showing the clutch in a different position; and Fig. 3 is a section taken on line $x$—$x$ of Fig. 1.

In the drawings thus briefly described, the reference-letter A represents a rotary member, in this instance the driving axle of an automobile, and B a sprocket thereon by means of which power from the motor is transmitted.

C is a wheel provided with a hub D, loosely mounted upon the shaft and carrying a housing E within which the several parts of the clutch mechanism are situated. This housing is made up of complementary disk members $a$ and $b$, an annular section $c$, the inner surface of which constitutes a trackway, and a hub section $d$.

Fixed upon the shaft A within the housing described is an eccentric F, and positioned between the eccentric and the trackway $c$ of the housing is a movable member G, in this instance a roller—of a size and so positioned as to be wedged between the periphery of the eccentric and the trackway upon the rotation of the eccentric in either direction. When so wedged, the parts are locked together, and an operative connection is formed between the driving shaft or axle and the wheel. Preferably, we provide a carrier H for the member G, and in which said member is journaled for rotary movement the carrier encircling, as shown, the eccentric and adapted to be supported thereby. In construction, the carrier comprises preferably a single ring, and within openings formed in the ring is journaled the roller G referred to, and preferably supplemental rollers I and J, these latter being of less size than the roller G and serving primarily to form an antifriction bearing between the carrier and the eccentric to permit of the proper positioning of the wedging roller.

From the foregoing description of the clutch mechanism, it will be obvious that as the eccentric turns in one direction, for instance as indicated by the arrow in Fig. 1, a locking engagement will be effected between the parts and the wheel will be positively driven in the direction of the eccentric. Upon reversing the direction of movement of the eccentric, the roller G will be first released, and subsequently engaged by the eccentric after the latter has made substantially one revolution and a reverse movement of the vehicle wheel will be effected. It will also be apparent that the clutch will permit the driven member to travel at greater speed than the driving member in the same direction of travel, whether that be forward or backward. This is especially serviceable where the clutch is used in connection with automobiles, as when the vehicle is turning corners it permits the outer wheel to run free at a speed exceeding that of the drive axle, the advantage of which will be obvious. Attention is also directed to the fact that the roller G of the clutch, besides acting as the wedge member, serves by reason of its relatively greater weight to unbalance the carrier, holding the same normally in a position with the wedge roll at the low point. Thus, the eccentric when revolving is prevented from carrying the ring with it, and the establishing of an operative connection between the drive and driven members is always possible.

For the purpose of reducing the friction to a minimum, we have provided an antifriction bearing between the carrier and the casing walls. We have here shown the bearing in the form of rollers K arranged within transverse recesses in the carrier ring, and pivoted thereto, the rollers being adapted to travel upon either the disk $a$ or $b$, according to the position of the carrier.

What we claim as our invention is,—

1. In combination with the driving axle of an automobile, of a wheel loosely mounted thereon carrying an inclosing casing, an eccentric fixed upon the axle within the casing, a carrier encircling the eccentric, antifriction bearings between the carrier and casing, and a roller journaled in bearings upon the carrier adapted to be wedged between the eccentric and casing wall upon the rotation of the eccentric in either direction.

2. The combination with the driving axle of an automobile of a wheel loosely mounted thereon carrying an inclosing casing provided with a trackway, an eccentric fixed upon the axle within the casing, an annular member eccentric to the trackway, and a roller carried by said member adapted to be wedged between the eccentric and casing wall upon the rotation of the eccentric in either direction.

3. The combination with the driving axle of an automobile, of a wheel loosely mounted thereon carrying an inclosing casing provided with a trackway, an eccentric fixed upon the axle and positioned within the casing, an annular member surrounding and supported by said eccentric, said member being arranged eccentric to the trackway, and a roller carried by said annular member adapted to be wedged between the eccentric and the trackway of the casing upon rotation of the eccentric in either direction.

In testimony whereof we affix our signatures in presence of two witnesses.

WARREN W. ANNABLE.
JOHN W. FITZGERALD.

Witnesses:
GEORGE WALLER,
SEYMOUR R. BERKEY.